United States Patent [19]

Mori et al.

[11] 3,810,094

[45] May 7, 1974

[54] CHARACTER TYPE DISCRIMINATOR FOR CHARACTER READERS

[75] Inventors: Kenichi Mori, Yokohama; Hisao Takebe, Tokyo, both of Japan

[73] Assignee: Tokyo Shibaura Electric Co. Ltd., Saiwai-ku, Kawasaki-shi, Japan

[22] Filed: July 19, 1972

[21] Appl. No.: 273,289

[30] Foreign Application Priority Data

July 21, 1971 Japan .............................. 46-53906

[52] U.S. Cl.340/146.3 D, 340/146.3 AH, 340/146.3 ED

[51] Int. Cl. ........................ G06k 9/02, G06k 7/015

[58] Field of Search ............ 340/146.3 FT, 146.3 Z, 340/146.3 Y, 146.3 WD, 146.3 QA, 146.3 AC, 146.3 AE, 146.3 AH, 146.3 B, 146.3 Q, 146.3 D

[56] References Cited

UNITED STATES PATENTS

| | | | |
|---|---|---|---|
| 3,496,543 | 2/1970 | Greenly | 340/146.3 ED |
| 3,553,646 | 1/1971 | Hardin et al. | 340/146.3 D |
| 3,337,766 | 8/1967 | Malaby | 340/146.3 AH |
| 3,346,845 | 10/1967 | Fomenko | 340/146.3 Y |

OTHER PUBLICATIONS

Smeltzer–"Character Recognition by Automatic Comparison," IBM Tech. Discl. Bull., Vol. 7, No. 10, March 1965, page 937.

*Primary Examiner*—Thomas A. Robinson
*Attorney, Agent, or Firm*—Flynn and Frishauf

[57] ABSTRACT

A character type discriminator uses a record medium carrying at least two series of characters to be read out, each type of which differs and which are enclosed with distinguishable frames. The recorded surface of the medium is scanned by a flying-spot scanner. The bright and dark light spots reflected from or transmitted through the medium are applied via a photomultiplier to a quantizer to produce therefrom "1" and "0" binary digits. Output signals from the quantizer are supplied to a control circuit. The control circuit has a pair of output terminals connected to counters for counting the number of elemental points on the medium scanned in vertical and horizontal directions to control the respective deflection coils of the scanner, and has an output terminal connected to a frame condition detector for determining the different physical features of the frames to discriminate the type of characters indicated therein.

6 Claims, 8 Drawing Figures

CHARACTER TYPE DISCRIMINATOR FOR CHARACTER READERS

The present invention relates to a character type discriminator for character readers and more particularly to a character type discriminator suitable for use as a preprocessing device for character readers which are so designed as to read out characters of two or more types written or printed on a record carrier.

The term "characters" in this specification is intended to mean the letters and characters used in languages of the world, numerals, figures and marks.

The term "the type of characters," as used herein, is defined to mean all patterns of a series of characters consisting of a single kind or combinations of more kinds, whether printed or handwritten.

Presently employed record carriers (or medium) on which characters of two or more types are written or printed, are for example, debit, receive and transfer slips. On the surfaces of these slips there are generally printed and/or hand-written series of characters of one or more types.

One of the known apparatuses for reading out characters indicated on such a record carrier is devised to read out the characters while discriminating their types by their positions by noting the presence of a particular relationship between the type and position of characters written on the carrier.

However, a character reader of such arrangement has the drawbacks that it is always necessary to define not only the recording position of characters to be read out on the record carrier but also the relative position of the record carrier and the scanner of a character reader, and moreover each time a different kind of record carrier is used, it is necessary to newly store the relationship between the type and position of characters shown on the fresh carrier.

Another type of prior art character reader is designed to read out directly characters on a record medium without previously discriminating the type of characters. A character reader of such design has the advantage of being applicable for various purposes, but has the shortcomings that its construction is not only more complicated and expensive than a character reader of such type which is devised to read out only characters on a specified record carrier, but also its efficiency and accuracy of readout are relatively poor because it is necessary to scan the whole surface of a record carrier including stains present in the spaces of the record carrier other than those occupied by the characters.

It is therefore the object of this invention to provide a character type discriminator for character readers capable of reading out characters on any kind of record carrier with a high efficiency and accuracy.

SUMMARY OF THE INVENTION

According to the present invention, there is provided a character type discriminator comprising at least two distinguishable frames inclosing at least two groups of characters of different types which are to be read out from a record medium; a detection means detecting the respective frames by optically scanning the record medium; and a discrimination means discriminating each of the types of said groups of characters enclosed by said frames in accordance with the distinctions of said frames detected by said detection means.

The present invention can be more fully understood from the following detailed description when taken in connection with the accompanying drawings, in which.

There will now be described by reference to the appended drawings a character type discriminator for character readers according to the preferred embodiments of the invention.

Figure 1:
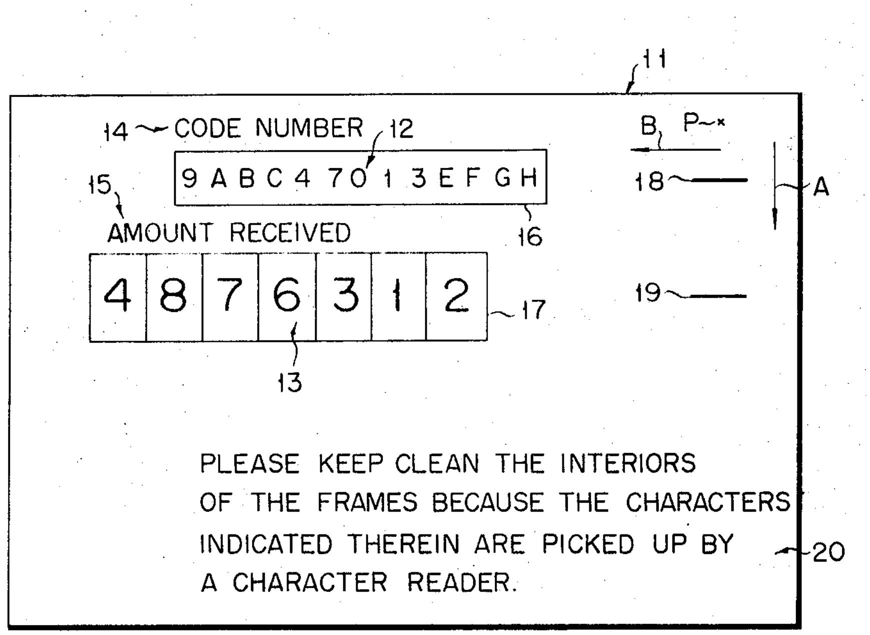
FIG. 1 is a plan view of one example of a record carrier prepared in accordance with the present invention.

FIG. 1 shows one example of a record medium (or carrier) 11 applicable for a character type discriminator of this invention. That is, a series of characters 12 indicating the code name of a customer are laterally printed at substantially the central part of the top or upper margin of the record carrier 11 by a machine such as a printer or a typewriter, and another series of characters 13 proving amount received are sideways written by hand at substantially the central margin of the record carrier 11. Also, the series of characters 14 and 15 "Code number" and "Amount received" representing the respective details of the aforesaid series of characters 12 and 13 are printed at the individual shoulders thereof.

In the record carrier 11, supposing that characters to be read out are only the series of printed characters 12 and hand-written characters 13, the respective circumferences of the series of characters 12 and 13 are enclosed respectively with frames 16 and 17 as hereinunder described according to the present invention.

That is, where the types of characters indicated in separate frames differ from each other as in this case, each of the frames differ in design, e.g., height, thickness or colour, is used for enclosing corresponding characters of a type. Alternatively, frames distinguishable in solid, dotted and broken lines can be employed. In FIG. 1, the heights of the frames 16 and 17 differ as hereinafter described.

The typed characters usually used have a height of about 3mm. Accordingly, a frame about 6mm high is high enough to enclose said series of printed characters 12 because the characters can be printed, even if they fail to line up, fully within the frame.

By contrast, the frame 17 to enclose said series of hand-written characters 13 is designed to have a height of about 8mm for the following reasons.

If the frame is narrow, the writers, particularly those who habitually write larger characters, will have difficulty because they must carefully put down small characters in the frame. Further, hand-written characters, as writtern in different manners, are different in size and shape, and therefore are not easily and accurately read out by the character readers.

The frame 17 is chopped by vertical lines into a series of sections, whereby characters can be neatly handwritten, one in each section of the frame 17.

There are printed on the right margin of the record carrier 11 proper two guide marks 18 and 19, e.g., horizontal lines about 2.5mm thick and 10mm long and substantially aligned with imaginary lines extending through the cutting in half the aforesaid frames 16 and 17 for indicating where the series of characters 12 and 13 are put down. A sentence 20 printed on the bottom or lower margin of the record carrier 11 is intended to call one's attention when one deals with the carrier 11, and should not be necessary to read out.

Figure 2:
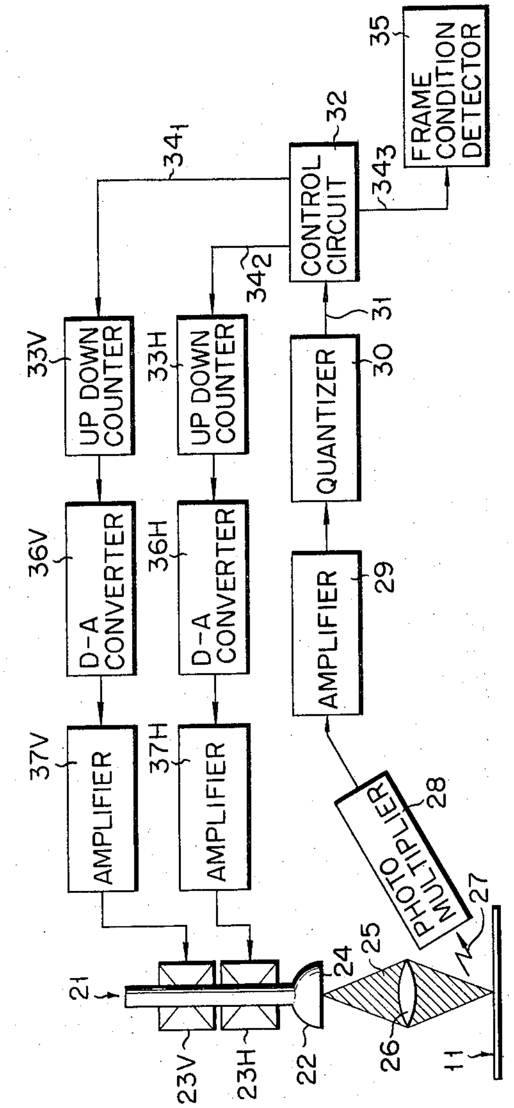
FIG. 2 is a schematic block circuit diagram of a character type discriminator according to an embodiment of this invention.

FIG. 2 shows a schematic block circuit diagram of a character type discriminator according to an embodiment of this invention which is so designed as to discriminate the type of characters indicated in the detected frame by determining the heights of the frames 16 and 17 enclosing the aforesaid two series of characters 12 and 13 to be read out.

Referring to FIG. 2, numeral 21 denotes a flying-spot scanner. Electron beams produced from the cathode of cathode ray tube 22 included in the scanner 21 are run, after being focused by a focusing coil (not shown) and then deflected by horizontal and vertical deflecting coils 23H and 23V, onto a fluorescent screen 24 of the cathode ray tube 22. A tiny light spot is formed upon the part of fluorescent screen 24 of the tube 22 bombarded by the electron beam as described above. The light beam 25 emanated from the tiny spot is focused through a convex lens 26 on the record carrier 11. The light spot 27 reflected from (or transmitted through) the record carrier 11 is then projected on a photomultiplier 28. In this case, the intensity of the reflected light spot 27 differs in accordance with areas on the record carrier 11 so that it is strong if the tiny spot on the fluorescent screen 24 of the cathode ray tube 22 is focused on a space of the record carrier 11 on which a character is not indicated, but is weak if the tiny spot from the cathode ray tube 22 is focused upon the black portion of the carrier on which a character is put down. Therefore, the photomultiplier 28 produces video signals having a voltage level which varies in response to the intensity of incident light.

The video signals thus obtained are amplified properly by an amplifier 29 and then supplied to a quantizer 30 which is devised to operate at a predetermined threshold voltage level to send forth "1" and "0" binary digits. Here, the quantizer 30 is so designed as to produce the output "1" when the black portion occupied by a character on the record carrier 11 is scaned by the scanner 21, while the output "0" when the white portion occupied by no character is scanned. Output signals from the quantizer 30 are applied via a line 31 to a control circuit 32.

The control circuit 32 has an output terminal $\mathbf{34_1}$ at which is produced a signal to operate a reversible (or up-down) counter 33V when the record carrier 11 is scanned in a vertical direction by the scanner 21, another output terminal $\mathbf{34_2}$ at which is obtained a signal to actuate a counter 33H (of reversible type, if required) when the carrier 11 is scanned in a horizontal direction by the scanner 21, and a further output terminal $\mathbf{34_3}$ at which is produced a signal to operate a frame condition detector 35 for discriminating the height of the detected frame when any of the frames 16 and 17 on the record carrier is scanned by the scanner 21. Output signals from the counters 33V and 33H are supplied via corresponding D-A converters 36V and 36H and amplifiers 37V and 37H to the corresponding deflecting coils 23V and 23H respectively.

Thus, electron beams emanated from the cathode of the cathode ray tube 22 of the scanner 21 are always deflected in a direction in accordance with the numbers of counts in the two counters 33V and 33H and then focused on the fluorescent screen 24 of the cathode ray tube 22. It is supposed that the scanning point of the scanner 21 exists at an original point P on the record carrier 11 when both the counters 33V and 33H count zero.

Under this condition, the scanning point on the record carrier 11 shifts in a direction of an arrow A of FIG. 1 as the number of counts in the counter 33V increases. On the other hand, the scanning point on the record carrier 11 moves in a direction of an arrow B as the number of counts in the counter 33H increases.

Figure 3:
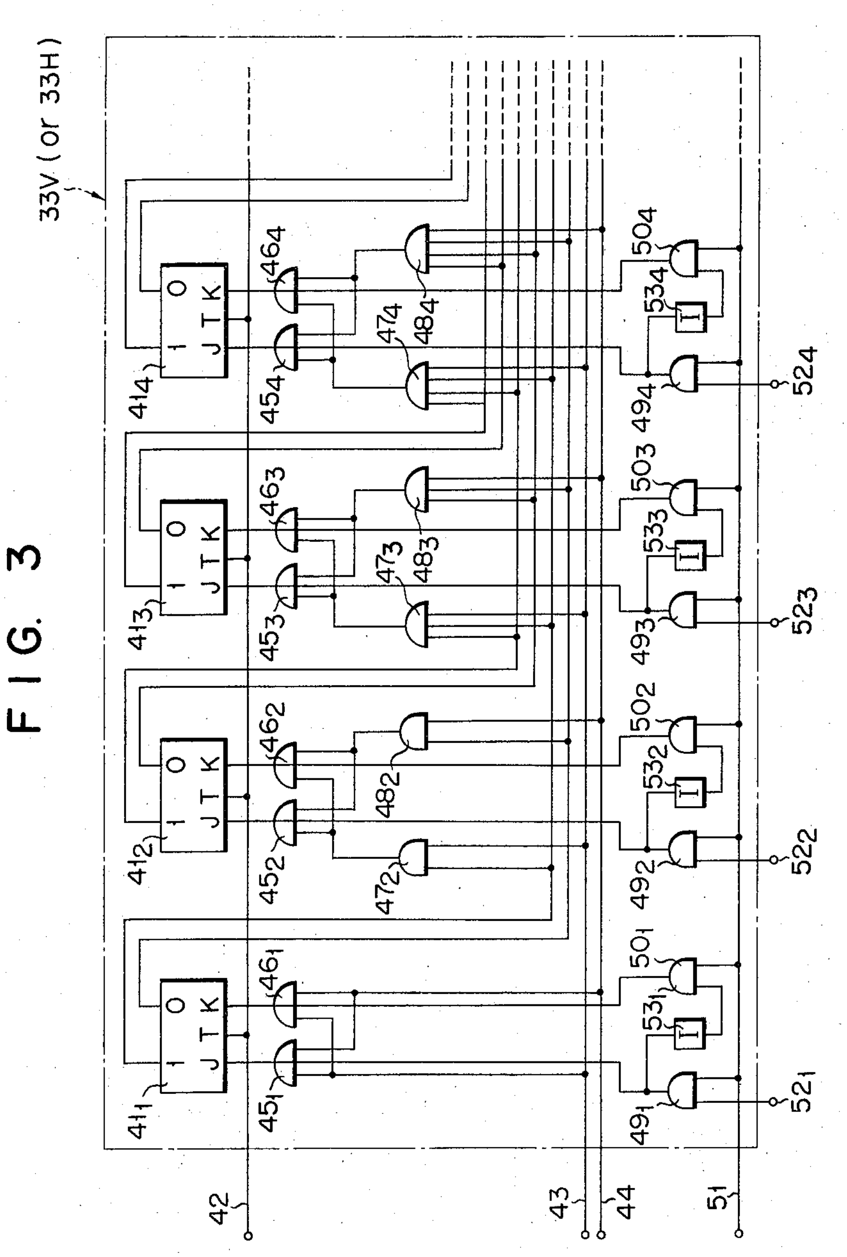
FIG. 3 is a logic circuit diagram showing a detailed construction of the counters shown in FIG. 2.

FIG. 3 illustrates a detailed logic circuit diagram of the counters 33V and 33H shown in FIG. 2.

Each of the counters is constructed by a plurality of J-K flip-flop circuits $\mathbf{41_1}$, $\mathbf{41_2}$, $\mathbf{41_3}$, $\mathbf{41_4}$, . . . cascade connected in turn as described below.

The first flip-flop circuit $\mathbf{41_1}$ has three input terminals: a T-terminal supplied with a clock or shifting signal appearing on a line 42, and J and K-terminals jointly supplied with a pulse signal appearing on a line 43 with the count-up mode and a pulse signal appearing on a line 44 with the count-down mode via corresponding one of a pair of OR gates $\mathbf{45_1}$ and $\mathbf{46_1}$ respectively, and also has two output terminals: a "1" terminal supplying a "1" output of a binary logic when there arise three combinations: J = "1," K = "0," and T = "1;" J = "0," K = "0," T = "0" and said "1"-terminal = "1"; and J = "1," K = "1," T = "1" and the "1"-terminal = "0," but in the cases of all the other combinations, supplying a "0" output, and a "0"-terminal supplying outputs inverted to those from said "1"-terminal in all the combinations. All the cases where there are supplied a "1" output of a binary logic to the "1"-terminal and a "0" output of a binary logic to the " 0"-terminal are said to be in "set condition," whereas all the cases where there are supplied a "1" output to the "0"-terminal and a "0" output to the "1"-terminal are said to be in "reset condition."

The remaining flip-flop circuits each have three input terminals, i.e., a T-terminal, a J-terminal and a K-terminal.

The T-terminals are connected to the line 42 and the K- and J-terminals are each connected to the output terminal of one of the corresponding pair of OR gates, i.e., $\mathbf{45_2}$–$\mathbf{46_2}$, $\mathbf{45_3}$–$\mathbf{46_3}$ or $\mathbf{45_4}$–$\mathbf{46_4}$. Every pair of OR gates is provided with two input terminals connected to the output terminals of its corresponding pair of AND gates, i.e., $\mathbf{47_2}$–$\mathbf{48_2}$, $\mathbf{47_3}$–$\mathbf{48_3}$ or $\mathbf{47_4}$ $\mathbf{48_4}$. One of each paired AND gates has two or more input terminals respectively connected to the line 43 and "1"-output terminals of all the preceding flip-flop circuits; the other of each paired AND gates has also two or more input terminals respectively connected to the line 44 and "0"-output terminals of all the preceding flip-flop circuits. The paired AND gates each have "1"- and "0"-output terminals.

Further, each of the flip-flop circuits is provided with a pair of AND gates $49_1$–$50_1$, $49_2$–$50_2$, $49_3$–$50_3$ or $49_4$–$50_4$ to write a given value of binary significance in the corresponding flip-flop circuits. Any paired AND gates has an input terminal connected jointly to a line 51 on which a write-in pulse is applied. One of any paired AND gates has another input terminal $52_1$, $52_2$, $52_3$ or $52_4$ connected to an external pulse source (not shown) to write a given value of binary significance in the corresponding one of the flip-flop circuits, and the other AND gate has another input terminal connected via a corresponding inverter $53_1$, $53_2$, $53_3$ or $53_4$ to the output terminal of said corresponding one AND gate $49_1$, $49_2$, $49_3$ or $49_4$. Further, the other AND gate has an output terminal connected via the corresponding OR gate $46_1$, $46_2$, $46_3$, or $46_4$ to the K-terminal of the corresponding flip-flop circuit, and the output terminal of one of the paired AND gates is also connected via the corresponding OR gate $45_1$, $45_2$, $45_3$ or $45_4$ to the J-terminal of the corresponding flip-flop circuit.

It is supposed that the scanning point moves on the record carrier 11 in the direction of the arrow A and B, or in the opposite direction or 0.1mm in both the counters 33V and 33H each comprised of the aforesaid cascade-connected flip-flop circuits every time the counters carry or borrow one bit.

Figure 4:
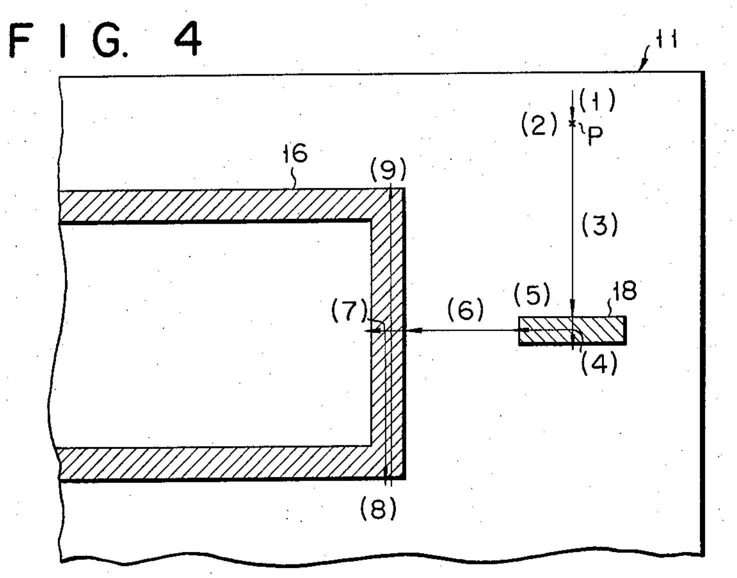
FIG. 4 is an enlarged view of part of the record carrier of FIG. 1, illustrating the sequential steps of scanning the record carrier by a flying-spot scanner.

FIG. 4 shows an enlarged view of part of the record carrier 11, illustrating the sequential steps of scanning the carrier 11 by the flying-spot scanner 21 according to the preferred embodiment of this invention to discriminate the height of the frame 16 in which the series of characters 12 are printed.

That is, the scanning is carried out by steps of (1) starting the operation of the circuitry of FIG. 2, (2) focusing the scanning point by the scanner 21 upon the original point P of the record, (3) tracing the scanning point from the original point P toward the guide mark 18 for the frame 16 until the top end thereof is detected, (4) setting the scanning point back to the point of half the height of the mark 18 immediately after the bottom end thereof is detected, (5) moving the scanning point from the point of the fourth step toward the frame 16 until the left side or rear end of the mark 18 is detected, (6) shifting the scanning point from the point of the fifth step continuously toward the frame 16 until the right side or front end thereof is detected, (7) setting the scanning point back to the point of half the width of the frame 16 directly after the left side or rear end thereof is detected, (8) tracing the scanning point downward from the point of the seventh step until the bottom end of the frame 16 is detected, and (9) finally shifting the scanning point upward from the point of the eighth step until the top end of the frame 16 is detected.

Figure 5:
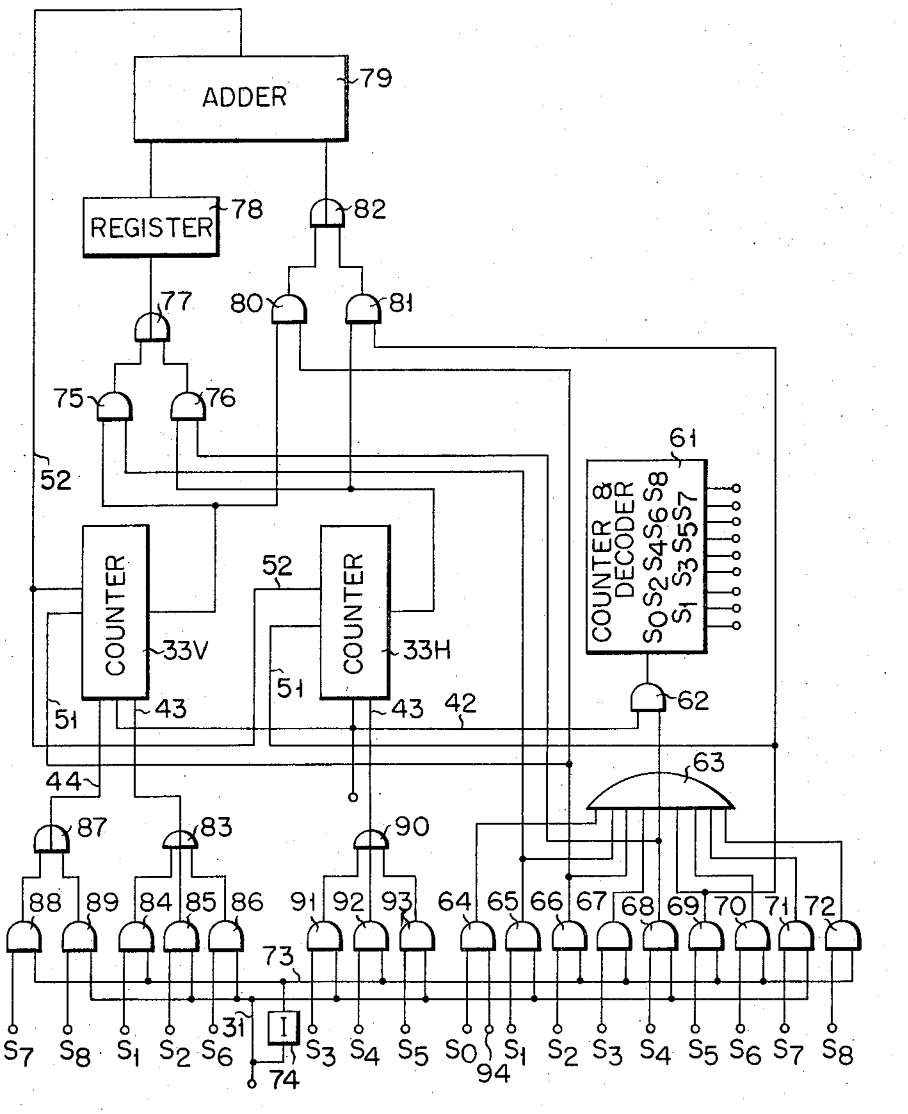
FIG. 5 is a schematic logic circuit diagram of the control circuit shown in FIG. 2 which is so designed as to operate in connection with the counters according to the sequential steps of FIG. 4.

FIG. 5 is a practical logic circuit diagram of the control circuit 32 shown in FIG. 2 which is so designed as to operate in connection with the counters 33V and 33H according to the nine sequential steps of FIG. 4.

There is provided a counter-decoder 61 which comprise a counter and a decoder widely known in the art, and which has an input terminal connected to the output terminal of an AND gate 62 and also has nine output terminals $S_0$, $S_1$, $S_2$, $S_3$ $S_4$, $S_5$, $S_6$, $S_7$ and $S_8$ each supplying a "1" output of binary logic in accordance with the corresponding one of nine different steps as described above. The AND gate 62 has an input terminal connected to the aforesaid line 42 and another input terminal connected to the output terminal of an OR gate 63 which has nine input terminals connected to the separate output terminals of AND gates 64, 65, 66, 67, 68, 69, 70, 71 and 72 which have each two input terminals as follows. The AND gate 64 has an input terminal 94 supplied with a start pulse to start the operation of the circuitry of FIGS. 2 and 5 and another input terminal connected to the output terminal $S_0$ of the counter-decoder 61. The AND gates 65, 68 and 71 have input terminals connected jointly to the aforesaid line 31 and further input terminals connected to the corresponding output terminals $S_1$, $S_4$ and $S_7$ of the counter-decoder 61. The remaining AND gates 66, 67, 69, 70 and 72 have input terminals connected commonly to a line 73 which is connected via an inverter 74 to the line 31 and further input terminals connected to the corresponding output terminals $S_2$, $S_3$, $S_5$, $S_6$ and $S_8$ of the counter-decoder 61. Additionally, the output terminal of the AND gate 65 is connected to an input terminal of an AND gate 75 having another input terminal connected to a plurality of output terminals (jointly shown by a single line) of the counter 33V and the output terminal of the AND gate 68 is connected to an input terminal of an AND gate 76 having another input terminal connected to a plurality of output terminals (jointly indicated by a single line) of the counter 33H. The output terminals of both the AND gates 75 and 76 are connected to two input terminals of an OR gate 77 which has an output terminal connected via a register 78 to an input terminal of an adder 79. The output terminal of the AND gate 66 is connected to an input terminal of an AND gate 80 having another input terminal connected to the output terminal of the counter 33V and is also connected to the aforesaid line 51 for this counter, and the output terminal of the AND gate 69 is connected to an input terminal of an AND gate 81 having another input terminal connected to the output terminal of the counter 33H and is also connected to the aforesaid line 51 for this counter.

The output terminals of both the AND gates 80 and 81 are connected to two input terminals of an OR gate 82 which has an output terminal connected to another input terminal of the adder 79. The adder is arranged to calculate the value of the height of the guide mark 18 and the value of the width of the frame 16 and has $(n + 1)$ output terminals when it assumes that the counter 33V has $n$ output terminals, the last of which is supplying an overflow signal of binary significance. Thus, the respective output terminals (jointly indicated by a single line) of the adder 79 are connected the second to the last thereof to the aforesaid first input $52_1$ to the last input terminals for the counter 33V to obtain the value of the half height of the guide mark 18 and the value of the half width of the frame 16, the first output terminal of the adder being vacant.

Also, the output terminals of the adder are connected to the aforesaid input terminals $52_1$, $52_2$, $52_3$, $52_4$. . . for the counter 33H in the same manner as the counter 33V. The counter 33V has also three input terminals: the first terminal connected to the line 42; the second terminal connected to the output terminal of an OR gate 83 which has three input terminals connected to the individual output terminals of AND gates 84, 85 and 86; and the third terminal connected to the output terminal of an OR gate 87 which has two input terminals connected to the separate output terminals of AND gates 88 and 89. The AND gates 84 and 88 have input terminals connected to the line 73 and another input terminal connected jointly to the corresponding output terminals $S_1$ and $S_7$ of the counter-decoder 61 respectively, the AND gates 85, 86 and 89 have input terminals connected jointly to the line 31 and further input terminals connected to the corresponding output terminals $S_2$, $S_6$ and $S_8$ respectively. On the other hand, the counter 33H has two input terminals: one connected to the line 42; and the other connected to the output terminal of an OR gate 90 which has three input terminals connected to the respective output terminals of AND gates 91, 92 and 93. The AND gates 91 and 93 have input terminals connected jointly to the line 31 and other input terminals connected to the corresponding output terminals $S_3$ and $S_5$ of the counter-decoder 61, and the AND gate 92 has an input terminal connected to the line 73 and another input terminal connected to the corresponding output terminal $S_4$ of the decoder 61.

In the circuitry of FIG. 5, the counter-decoder 61 is supplying a "1" to the first output terminal thereof when the start pulse for the circuitry is applied to the input terminal 94 of the AND gate 64. Therefore, the AND gate 64 is actuated to supply the output signal therefrom to the AND gate 62 through the OR gate 63. Under this condition, the AND gate 62 is actuated to supply the output signal therefrom to the counter-decoder 61 when the first clock pulse appearing on the line 42 has been applied to the AND gate 62 synchronously with the output signal from the OR gate 63, whereby the counter-decoder 61 is operated to supply a "1" output to the second output terminal $S_1$ thereof and the scanning point on the record carrier 11 is automatically set at the original point P by the scanner 21.

At this time, there is supplied a "0" output which corresponds to spaces of the record carrier 11 other than those occupied by the aforesaid characters from the output line 31 of the quantizer 30 of FIG. 2 to the control circuit 32 and is supplied a "1" output to the line 73 through the inverter 74.

Accordingly, the AND gate 84 is rendered conductive to continuously apply the output signals therefrom to the line 43 for the count-up mode of the counter 33V each time a clock pulse is applied to the line 42 until the scanning point on the record carrier 11 reaches the top end of the guide mark 18 for the frame 16 to be discriminated from the original point P. Since a "1" output is supplied from the output line 31 of the quantizer to the control circuit 32 when the scanning point has reached the top end of the guide mark 18, the AND gate 65 is actuated to supply the output signal therefrom to the AND gate 62 through the OR gate 63 and also supply to the AND gate 75 to store therethrough the numbers of counts in the counter 33V in the register 78.

Then, the AND gate 62 is anded to apply the output signal therefrom to the counter-decoder 61 to supply a "1" output to the third output terminal $S_2$ thereof when the clock pulse has been supplied to the line 42. At this time, the AND gate 85 is actuated to successively supply the output signals therefrom to the line 43 for the count-up mode of the counter 33V through the OR gate 83 under the control of the clock pulses on the line 42 until the scanning point comes out from the bottom end of the guide mark 18, since a "1" output is supplied from the output line 31 of the quantizer 30 to the control circuit 32 when the scanning point has reached the guide mark 18. Then, the AND gate 66 is rendered conductive to supply the output signal therefrom to the AND gate 80 and also supply to the counter-decoder 61 through the OR gate 63 and the AND gate 62 synchronously with the clock pulse on the line 42, since a "0" output is applied to the line 73 when the scanning point has come out from the bottom end of the guide mark 18, thereby supplying a "1" output to the fourth output terminal $S_3$ of the decoder 61. Thus, the AND gate 80 is actuated to supply the numbers of counts in the counter 33V to the adder 79 through the OR gate 82. As a result, there is obtained the sum of the value of counts from the register 78 and the value of counts from the OR gate 82 on the output line 52 of the adder 79. At this time, the numbers of counts in the counter 33V are set at the value corresponding to the point of half the height of the guide mark 18 as described above, since the output signal from the AND gate 66 is supplied to the line 51 of the counter 33V for writing therein a given value of binary significance.

Then, the AND gate 91 is actuated to continuously supply the output signals therefrom to the line 43 for the count-up mode of the counter 33H through the OR gate 90 each time a clock pulse is applied to the line 42 until the scanning point comes out from the left side or front end of the mark 18, since a "1" output is applied to the line 31 when the scanning point has set back to the point of half the height of the mark 18.

Then, the AND gate 67 is actuated to supply the output signal therefrom to the counter-decoder 61 through the OR gate 63 and the AND gate 62 under the control of the clock pulse on the line 42 thereby to apply a "1" output to the fifth output terminal $S_4$ of the decoder 61, since a "1" output from the quantizer 30 is supplied to the line 73 through the inverter 74 when the scanning point has come out from the left side or the front end of the guide mark 18. Under this condition, the AND gate 92 is actuated to continuously supply the output signals therefrom to the line 43 of the counter 33H through the OR gate 90 each time a clock pulse is applied to the line 42 until the scanning point arrives at the right side or front end of the frame 16. Then, the AND gate 68 is actuated to supply the output signal therefrom to the AND gate 76 and also supply to the counter-decoder 61 through the OR gate 63 and the AND gate 62 under the control of the clock pulse on the line 42, since a "1" output is applied to the line 31 when the scanning point has reached the right side or front end of the frame 16, thereby supplying a "1" output to the sixth output terminal $S_5$ of the decoder 61.

Thus, the numbers of counts in the counter 33H are stored in the register 78 through the now actuated AND gate 76 and the OR gate 77. Then, the AND gate 93 is actuated to continuously supply the output signals therefrom to the line 43 for the count-up mode of the counter 33H through the OR gate 90 each time a clock pulse is applied to the line 42 until the scanning point reaches the left side or rear end of the frame 16, since a "1" output is applied to the line 31 when the scanning point has reached the frame 16. Then, the AND gate 69 is actuated to supply the output signal therefrom to the AND gate 81 and also supply to the counter-decoder 61 through the OR gate 63 and the AND gate 62 synchronously with the clock pulse on the line 42, since a "0" output is applied to the line 73 when the scanning point has come out from the left side or rear end of the frame 16, thereby to supply a "1" output to the seventh output terminal $S_6$ of the decoder 61.

Thus, the AND gate 81 is rendered conductive to supply the numbers of counts in the counters 33H to the adder 79 through the OR gate 82. As a result, there is obtained the sum of the value of counts from the register 78 and the value of counts from the OR gate 82 on the output line 52 of the adder 79. At this time, the numbers of counts in the counter 33H are set at the value corresponding to the point of half the width of the frame 16 as described above, since the output signal from the AND gate 69 is applied to the line 51 of the counter 33H for writing therein a given value of binary significance. Then, the AND gate 86 is actuated to continuously supply the output signals therefrom to the line 43 for the count-up mode of the counter 33V through the OR gate 83 each time a clock pulse is a applied to the line 42 until the scanning point has come out from the bottom end of the frame 16, since a "1" output is applied to the line 31 when the scanning point has set back to the point of half the width of the frame 16. Then, the AND gate 70 is actuated to supply the output signal therefrom to the counter-decoder 61 through the OR gate 63 and the AND gate 62 synchronously with the clock pulse on the line 42, since a "0" output is applied to the line 73 when the scanning point has come out from the bottom end of the frame 16, thereby supplying a "1" output to the eighth output terminal $S_7$ of the decoder 61. Then, the AND gate 88 is actuated to supply the output signals therefrom to the line 44 for the count-down mode of the counter 33V through the OR gate 87 each time a clock pulse is applied to the line 42 until the scanning point comes back into the frame 16, since a "1" output is applied to the line 73 when the scanning point is the outside of the frame 16. Then, the AND gate 71 is actuated to supply the output signal therefrom to the counter-decoder 61 through the OR gate 63 and the AND gate 62 under the control of the clock pulse on the line 42, since a "1" output is applied to the line 31 when the scanning point has been returned again into the frame 16, thereby to supply a "1" output to the ninth output terminal $S_8$ of the decoder 61. Then, the AND gate 89 is actuated to continuously supply the output signals therefrom to the line 44 for the count-down mode of the counter 33V through the OR gate 87 each time a clock pulse is applied to the line 42 until the scanning point comes out from the top end of the frame 16. Finally, the AND gate 72 is actuated to supply the output signal therefrom to the counter-decoder 61 through the OR gate 63 and the AND gate 62 synchronously with the clock pulse on the line 42, since a "1" output is applied to the line 73 when the scanning point has come out from the top end of the frame 16, thereby supplying a "1" output again to the first output terminal $S_0$ and preparing the next operation for the frame 17.

Figure 6:
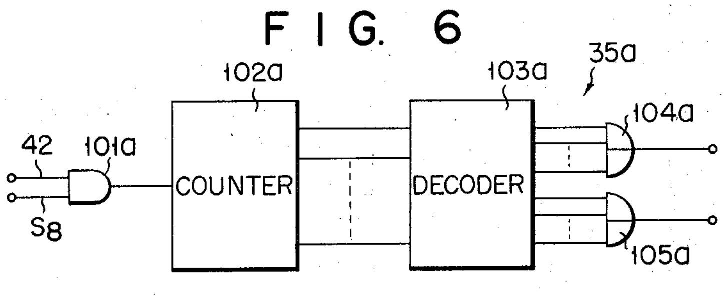
FIG. 6 is a detailed circuit arrangement of the frame condition detector shown in FIG. 2.

FIG. 6 is a detailed circuit arrangement 35*a* of the frame condition detector 35 shown in FIG. 2 which is so designed as to discriminate each of the types of said series of characters to be read out indicated in the two frames 16 and 17 respectively by determining the individual heights of the frames 16 and 17 as described above.

The frame condition detector 35*a* includes an AND gate 101*a* having an input terminal connected to the ninth output terminal $S_8$ of the counter-decoder 61 and another input terminal connected to the line 42 to which the clock pulses are applied, and a counter 102*a* connected to the output terminal of the AND gate 101*a*. Therefore, the counter 102*a* counts the numbers of clock pulses applied to the line 42 while a "1" output is supplied to the ninth output terminal $S_8$ of the counter-decoder 61.

The numbers of counts from the counter 102*a* are supplied, after being decoded by a decoder 103*a*, to an OR gate 104*a* for the frame 16 and another OR gate 105*a* for the frame 17.

Suppose the height of the frame 16 is between 5.5mm and 6.5mm and of the frame 17 is between 7.5mm and 8.5mm. The OR gate 104*a* has ten input terminals connected to the output terminals indicating the values of 55 to 65 of the decoder 103*a* and the OR gate 105*a* has 10 input terminals connected to the output terminals indicating the values of 75 to 85 of the decoder 103*a*.

Figure 7:
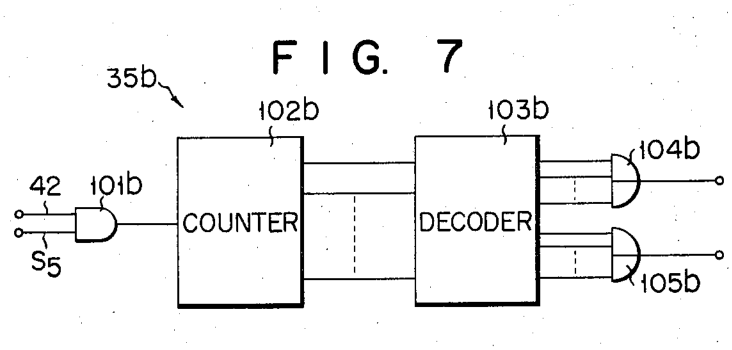
FIG. 7 shows another detailed circuit arrangement of the frame condition detector shown in FIG. 2.

FIG. 7 shows another detailed circuit arrangement 35*b* of the frame condition detector so devised as to discriminate in accordance with the widths of the frames 16 and 17 the types of said series of characters enclosed by the two frames. The frame condition detector 35*b* has the same construction as that of FIG. 6., except that it has an AND gate 101*b* having an input terminal which is connected to the sixth output terminal $S_5$ of the counter-decoder 61, instead of but, unlike that of the AND gate 101*a* of FIG. 6, not connected to the ninth output terminal $S_8$ of the counter-decoder 61. In FIG. 7, a counter 102*b* therefore counts the number of clock pulses applied to the line 42 while a "1" output is supplied to the sixth output terminal $S_5$ of the counter-decoder 61.

Consequently, if the widths of the frames 16 and 17 are between 0.3 and 0.5mm and between 0.9 and 1.1mm, respectively, OR gates 104*b* and 105*b* each have three input terminals. The three input terminals of the OR gate 104*b* and those of the OR gate 105*b* are connected to the output terminals producing the values of a decoder 103*b* 3 to 5 and 9 to 11, respectively.

Figure 8:
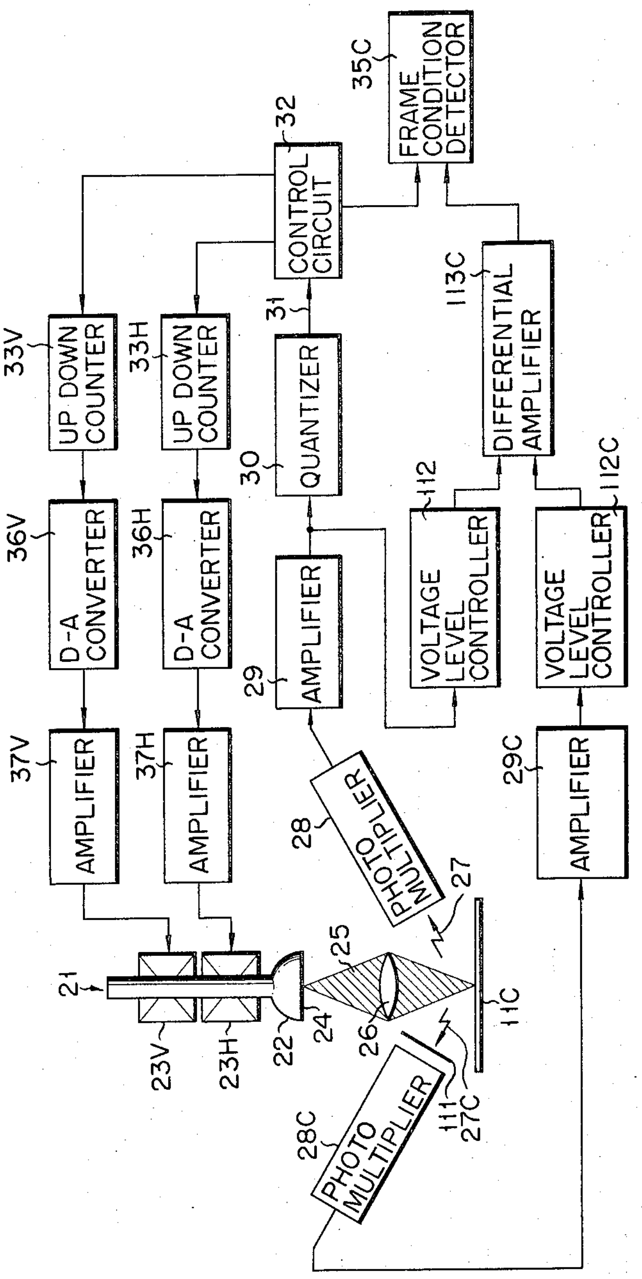
FIG. 8 shows a schematic block circuit diagram of a character type discriminator according to another embodiment of this invention.

FIG. 8 shows a schematic block circuit diagram of a character type discriminator according to another embodiment of this invention which is designed to discriminate the colours of different frames enclosing series of characters to be read out.

The discriminator comprises, in addition to the circuitry of FIG. 2, a filter 111 sensitive to a predetermined colour, a photomultiplier 28*c* for receiving the light spots transmitted through the filter 111 from a record carrier 11*c* carrying at least two frames of different colours which enclose series of characters to be read out, an amplifier 29*c* for amplifying the output video signals from the photomultiplier 28*c*, two voltage level controllers 112 and 112*c* which are connected to the output ends of both the amplifier 28 and 28*c* respectively and are designed to adjust nearly equally both the output voltage levels from the amplifiers 28 and 28*c* when colours other than the predetermined colour are detected by the filter 111 and a differential amplifier 113 having two input terminals connected to both the output ends of the voltage level controller 112 and 112*c* and an input terminal connected to a frame condition detector 35*c* constructed as described hereinbelow.

In the character type discriminator of such arrangement, the differential amplifier 113 produces output signals therefrom only when the frame detected during the operation of circuitry of FIG. 5 bears the same colour as that to which the filter 111 is sensitive. Accordingly, the frame condition detector 35*c* can be comprised of an AND gate having two input terminals connected to the output terminal of the control circuit 32 and the output terminal of the differential amplifier 113.

Further, frames enclosing series of characters to be read out may differ from each other; they may be made of a solid line, a broken line or a dotted line.

Thus, output signals obtained from the frame condition detector according to the present invention are supplied to the character readers so as to select the dictionaries therein in accordance with the discriminated type of characters to be read out.

What we claim is:

1. In a preprocessing device for a character reader, a character type discriminator for preprocessing information prior to actual character reading, and for use with a record medium having at least two distinguishable frames thereon enclosing at least two groups of characters of different types which are to be read out from the record medium, comprising:

an optical detection means detecting said respective distinguishable frames on said record medium by optically scanning said record medium, said detection means including:

a flying-spot scanner scanning successively said record medium in predetermined sequential steps;

a photomultiplier receiving light spots reflected from or transmitted through said record medium;

a quantizer quantizing at a predetermined threshold level to produce binary coded numerals "1" and "0" in response to the voltage levels of video signals from said photomultiplier;

a control circuit having an input terminal connected to the output terminal of said quantizer and a pair of output terminals each producing an output signal upon scanning said frames of said groups of characters in both the horizontal and vertical directions by said flying-spot scanner;

a pair of counters each connected to the corresponding output terminal of said control circuit; and a deflection means operating a deflecting system for said flying-spot scanner, utilizing output signals from said paired counters; and a discrimination means coupled to said control circuit of said detection means for discriminating each of the types of said groups of characters enclosed by said distinguishable frame in accordance with the distinctions of said frames detected by said detection means.

2. Apparatus according to claim 1 wherein there are further provided optically detectable scanning guide marks for said frames on imaginary lines of said record medium which extend through said respective frames, said detection means being responsive to said guide marks.

3. Apparatus according to claim 1 wherein said counters each comprise a plurality of cascade-connected J-K flip-flop circuits.

4. Apparatus according to claim 1 wherein said control circuit comprises a plurality of AND gates each having two input terminals, one being connected to the predetermined one of the output terminal of said quantizer and the output terminal connected via an inverter to the output terminal of said quantizer, and the other being connected to the corresponding one of a plurality of terminals determining the sequential steps by said flying-spot scanner; an OR gate having a plurality of input terminals connected to the respective output terminals of said AND gates; an AND gate having an input terminal connected to the output terminal of said OR gate and another input terminal connected to a clock pulse source for the device; a counter-decoder having an input terminal connected to the output terminal of said second-mentioned AND gate and a plurality of output terminals each producing a "1" output of binary logic in accordance with the sequential steps; a register storing the numbers of counts in said counters each of which corresponds to the starting end of said frames; a logic circuit arrangement producing output signals which correspond to the terminating end of said frames; and an adder obtaining the sum of the output signal from said register and the output signal from said logic circuit arrangement and supplying the output signal thereof to said counters to obtain one-half value of said sum from the adder.

5. Apparatus according to claim 1 wherein said discrimination means comprises an AND gate having two input terminals, one being connected to the output terminal of said counter-decoder detecting the height or width of each frame, and the other being connected to said clock pulse source for the device; a counter connected to the output terminal of said AND gate; a decoder connected to the output terminal of said counter; and a plurality of OR gates each having input terminals connected to the corresponding groups of output terminals of said counter which indicate each of the heights or widths of said frames.

6. Apparatus according to claim 1 further including a filter sensitive to a predetermined colour, a photomultiplier receiving the light spots from said record medium obtained through said filter, a differential amplifier which has a pair of input terminals connected to the output terminals of said first- and second-mentioned photomultipliers and which produces output signals only when a frame bearing a colour sensitive to said filter is detected, and said discrimination means comprises an AND gate which has two input terminals connected to the output terminal of said differential amplifier and to the output terminal detecting each of said frames of said control circuit.

* * * * *